E. J. COUGHLIN.
HOSE.
APPLICATION FILED FEB. 12, 1916.
1,256,520. Patented Feb. 19, 1918.
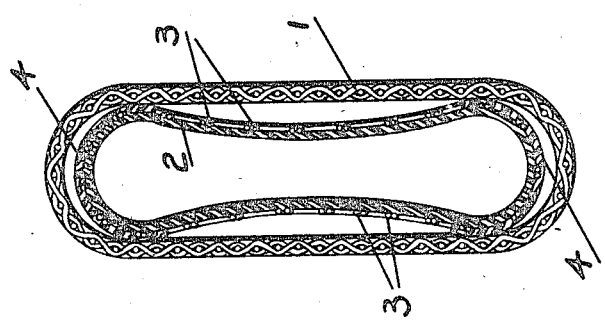
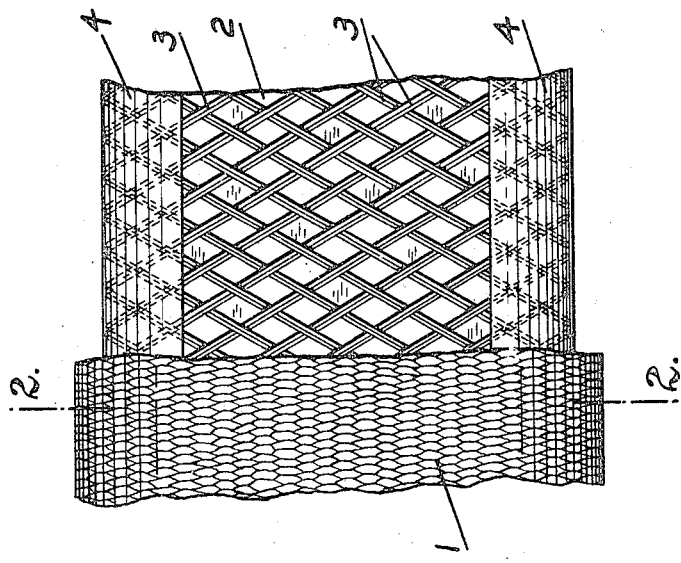
WITNESS:
INVENTOR
Edward J. Coughlin,
BY
Ernest Hopkinson
HIS ATTORNEY

UNITED STATES PATENT OFFICE.

EDWARD J. COUGHLIN, OF PASSAIC, NEW JERSEY, ASSIGNOR TO NEW YORK BELTING & PACKING COMPANY, A CORPORATION OF NEW YORK.

HOSE.

1,256,520.

Specification of Letters Patent.     Patented Feb. 19, 1918.

Application filed February 12, 1916.   Serial No. 77,843.

*To all whom it may concern:*

Be it known that I, EDWARD J. COUGHLIN, a citizen of the United States, residing at Passaic, county of Passaic, and State of New Jersey, have invented certain new and useful Improvements in Hose, of which the following is a full, clear, and exact description.

This invention relates to hose, more particularly fire hose comprising an outer strength-giving and wear-resisting ply of woven pervious material and an inner lining of rubber or rubber compound for sealing the tube against leakage.

Heretofore it has been customary to attach the above mentioned lining throughout its entire outer surface to the inner surface of the exterior protective covering, the result being that when either the tubular lining becomes leaky, or the protective covering becomes worn and weak, it is necessary to discard the entire structure. Attempts have been made to manufacture a hose wherein the lining and covering were unattached so that either might be replaced as necessary, but such attempts for the most part have been unsuccessful owing to difficulties attributable to the yielding properties of the rubber tube so provided.

The result of this yielding property of the inner tube is that the pressure of the water causes longitudinal creeping and folding thereof to such an extent that the passage of the fluid through the hose is seriously retarded or completely stopped. Attempts have been made to overcome this longitudinal creeping effect of an unsupported separable rubber tube, by attaching thereto a non-yielding layer of fabric material. Such a support prevents any longitudinal stretch of the tube but at the same time prevents the lateral or circumferential yield which is necessary to form a snug fit with the outer protective covering, the result being that adequate support is not given the tube to withstand the usual high pressure of the water. Another objection to such a structure is that, when the hose is bent sharply, the tube kinks and buckles seriously, frequently to an extent that it entirely prevents the flow of water therethrough.

By this invention I provide a tube, constructed in such a manner that the above noted tendency of longitudinal creeping is obviated, but which is capable of a slight circumferential stretch such that it will be forced by the water pressure firmly against the outer protective covering and lie smoothly thereagainst while in use. I accomplish my object by a novel construction fully set forth in the following specification and illustrated in the accompanying drawings, wherein:—

Figure 1 is a plan view of a piece of hose built according to this invention showing the protective covering partly broken away; and Fig. 2 is a cross-sectional view of the same taken on the line 2—2, of Fig. 1.

Referring to the drawings, 1 indicates a woven hose covering of any preferred construction, the same being usually formed of heavy cotton or linen yarns woven into tubular form on a circular loom. The numeral 2 designates an impervious tube of rubber or rubber compound.

This tube is constructed so as to assume a flattened or elliptical cross-sectional shape when not subjected to pressure and is provided about its outer surface with a plurality of interwoven diagonally disposed strands 3 of any suitable substantially non-stretching fibrous or filamentary material. In order that they may be firmly united with the tube 2, the strands 3 are preferably applied thereto prior to its vulcanization. The numeral 4 designates additional layers of rubber material applied along opposite sides of the tube 2 which cover the strands 3 along the sharply curved edges of the tube but leave them exposed on the flattened portions. The tube as thus built up is then vulcanized so that all the parts are firmly united.

I thus provide along two sides of the tube frictional surfaces which grip the inner wall of the unattached protective covering, positively preventing any longitudinal creeping of the tube therein and serving to maintain the tube in its oval flattened shape when not subject to fluid pressure. The strands, however, being substantially separated one from another, permit a slight circumferential stretch in the tube so that the fluid pressure on its interior forces it hard against the non-elastic and unyielding outer protective covering. Inasmuch as the circumferential yield of the tube is accompanied by a tendency to a corresponding longitudinal shortening thereof, any folds, laps, or kinks are, upon the introduction of the fluid under pressure, immediately smoothed out by the resulting tension. The fibrous strands also serve to equalize the expansion of the tube so that all portions thereof are stretched to substantially the same degree and portions thereof are not confined by fabric as has been the case in previous hose of this type.

Inasmuch as rubber deteriorates with age much more rapidly than does woven textile material it may be seen that a hose constructed as above outlined is much more economical than one in which the outer protective covering and the waterproof lining is united into a unitary structure, since once the lining becomes leaky it is only necessary to remove it from the still serviceable covering and substitute a new one in its place. Particularly is this true in the case of hose for emergency uses in buildings, which is given no use except in case of fire. In such hose the textile covering is subjected to no wear whatever, and lasts indefinitely, but, heretofore, once the rubber portion rotted, it has been necessary to discard the whole structure, no matter how good the jacket.

While in the accompanying drawings I have shown the strands 3 applied in groups of two, I wish to be understood as not limiting myself to such construction, as they may equally well be disposed singly or in groups of three or more.

Having thus described my invention what I now claim as new and desire to protect by Letters Patent is:

1. Hose, comprising an outer protective covering and an inner tube of water-tight elastic material, said inner tube being loosely disposed in said covering and being provided on its outer surface with two sets of diagonally disposed parallel strands completely surrounding said inner tube, the strands of each of said sets being separated from each other a substantial distance and intersecting those of the other set, whereby the circumferential and longitudinal extension of said tube is limited.

2. Hose, comprising an outer protective covering and an inner tube of water-tight elastic material, said inner tube being loosely disposed in said covering and being provided on its outer surface with two sets of diagonally disposed parallel strands, the strands of each of said sets being separated from each other a substantial distance and intersecting those of the other set, and an additional layer of plastic material superposed on said strands over a portion of the surface of the tube, said strands acting to limit the circumferential and longitudinal extension of said tube, and said plastic layer to provide frictional engagement with the inner wall of said covering.

Signed at Passaic, N. J., this 7th day of February, 1918.

EDWARD J. COUGHLIN.